Sept. 10, 1946.  F. A. SMITH  2,407,300
DEFINITE-LENGTH ADHESIVE TAPE DISPENSER
Filed April 4, 1945  2 Sheets-Sheet 1
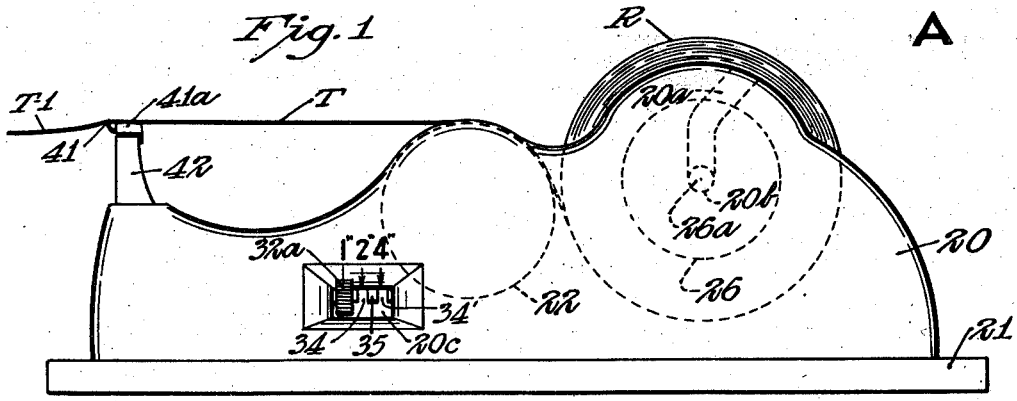
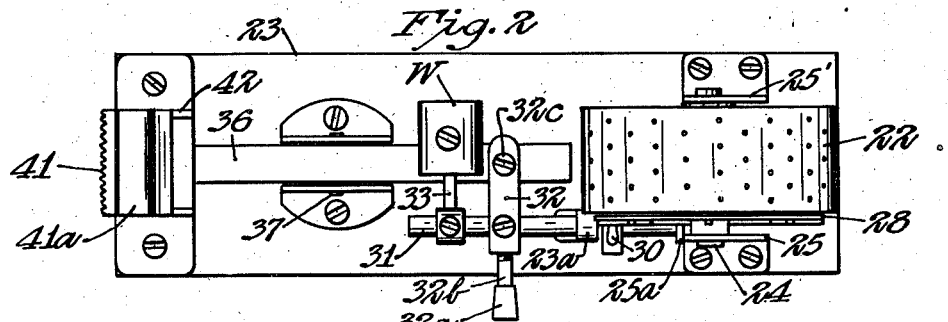
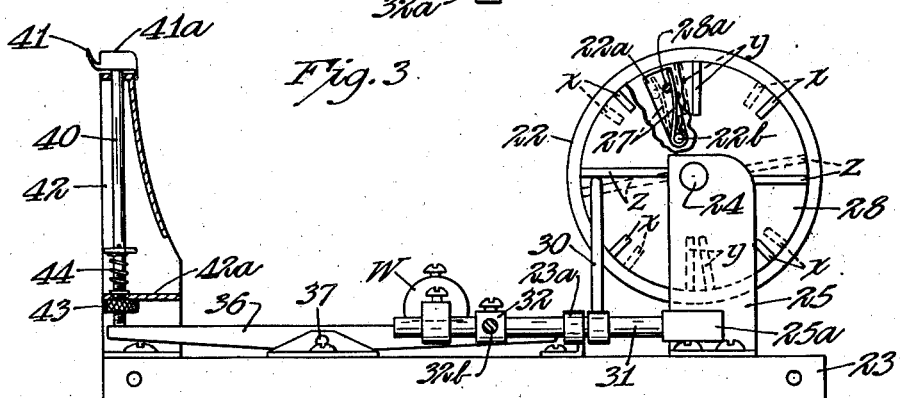
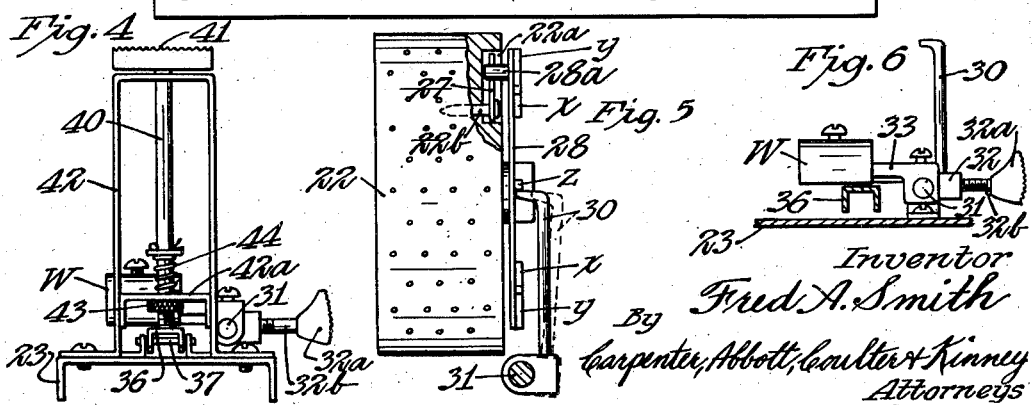
Inventor
Fred A. Smith
By Carpenter, Abbott, Coulter & Kinney
Attorneys Sept. 10, 1946.  F. A. SMITH  2,407,300
DEFINITE-LENGTH ADHESIVE TAPE DISPENSER
Filed April 4, 1945  2 Sheets-Sheet 2
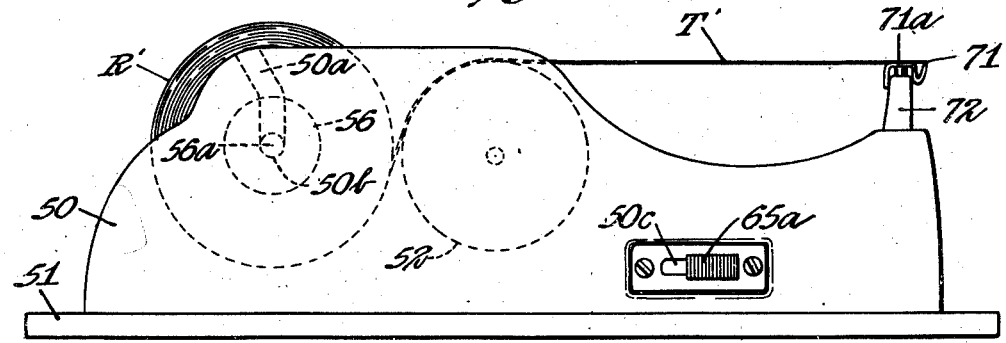
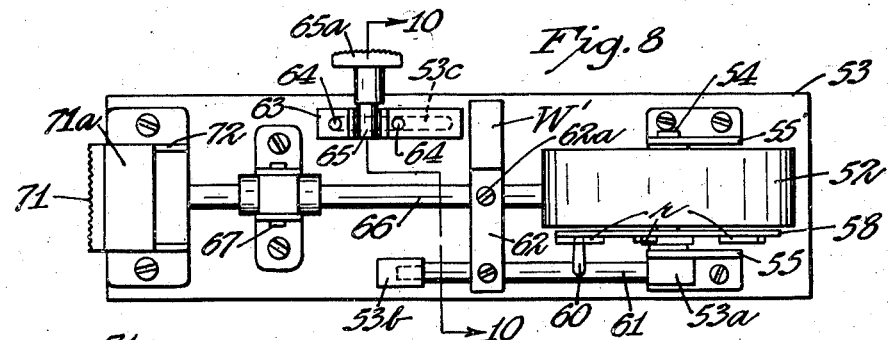
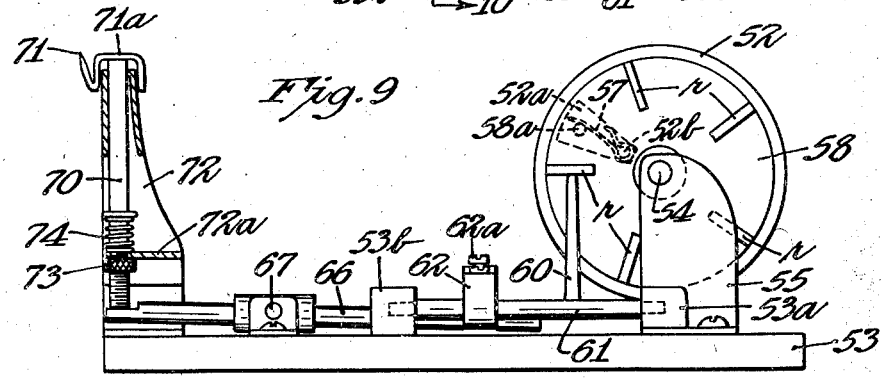
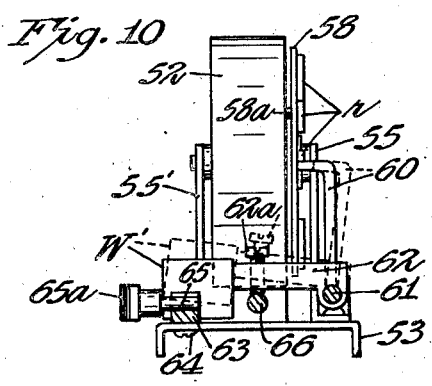
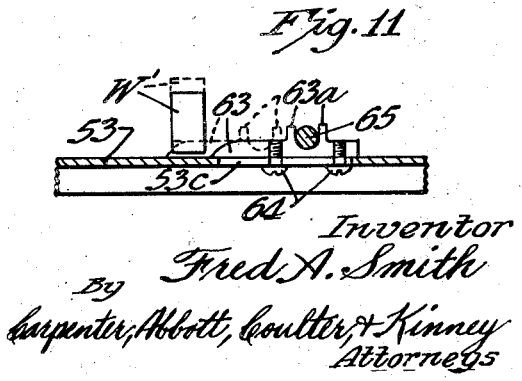
Inventor
Fred A. Smith
By Carpenter, Abbott, Coulter, & Kinney
Attorneys Patented Sept. 10, 1946

2,407,300

UNITED STATES PATENT OFFICE 2,407,300

DEFINITE-LENGTH ADHESIVE TAPE DISPENSER

Fred A. Smith, Newport Beach, Calif., assignor to Minnesota Mining & Manufacturing Company, St. Paul, Minn., a corporation of Delaware Application April 4, 1945, Serial No. 586,573

9 Claims. (Cl. 164—84.5)

This invention relates to dispensers for tape, particularly pressure-sensitive adhesive tape which is normally tacky without the necessity of being activated by solvents or heat, such as that sold commercially under the trade-mark "Scotch."

It relates particularly to devices which will dispense measured pieces of tape of a predetermined length. Such measuring dispensers previously known (both hand and power driven) possess certain defects which the present invention seeks to overcome. For example, the cost of power driven machines which dispense measured lengths of tape makes them expensive for use in locations where a piece of tape is needed only occasionally; and in hand operated dispensers the measuring attachments that are automatic are complicated, while those that are of simplified construction are not automatic but require a hand operation separate from the act of withdrawing tape in order to effect the measurement.

Objects of the present invention therefore include:

Provision of a tape dispenser whose mechanism and design are simple and inexpensive but which will dispense measured pieces of tape of a predetermined length, the measuring to be automatic or at least to take place without requiring a hand operation separate from the operation of withdrawing and severing a length of tape;

Provision of such a metering or measuring tape dispenser that may be quickly adjusted by an operator to alter the length of the pieces of tape that the machine dispenses; and Provision of such a metering dispenser that may be quickly adjusted by an operator to release tape continuously without restriction as to length to permit withdrawal of any length desired.

The invention provides a novel species of measured length dispenser of the class disclosed in Kimball Patent No. 2,251,942, August 12, 1941 and in Anderson Patent No. 2,305,592, December 22, 1942, i. e., a dispenser comprising means for holding a supply roll of tape, means for severing the tape and a metering or measuring means positioned between the tape-holding means and the severing means.

The present invention provides a tape dispenser comprising means for holding a supply roll of tape, a movable severing means, a metering mechanism for halting the withdrawal of tape from the roll after a predetermined length has been withdrawn, and means associated with the movable severing means whereby movement of the severing means automatically re-sets the metering mechanism to permit withdrawal of the next succeeding length of tape.

More particularly the present invention provides a dispenser comprising means for holding a supply roll of tape, a movable severing means, a measuring drum between the tape-holding means and the severing means, a stop associated with the drum, a catch for engaging the stop whereby rotation of the drum may be halted, and means associated with the movable severing means whereby movement of the severing means disengages the catch and stop to render the drum free to rotate.

In the illustrative embodiments described and illustrated herein the severing means is shown as a passive movable severing edge against which the tape is drawn to effect a cutting thereof. There may be a plurality of stops. They are shown herein as being associated with the drum by being fixed to a rotatable disc which is adjacent the drum and coaxial therewith, with means for mutual transfer of rotary movement between the drum and the disc in the form of a pin on the disc extending into a recess or mortise in the face of the drum. The catch for engaging the stop or stops is shown as a pivoted pawl normally yieldingly impelled into stop-engaging position. The catch and stop are disengaged by withdrawal of the catch or pawl from stop-engaging position. Such withdrawal is effected by connecting the severing means and the pawl so as to actuate the pawl by the movement of the severing means that occurs when the tape is drawn downwardly against the severing means. Means adapted to advance the stop automatically upon disengagement of the catch and stop is shown as a spring which yieldingly presses against the pin to impel the disc to rotate forwardly in relation to the drum sufficiently to position the stop beyond the point of engagement. This permits the catch or pawl to move into its normal stop-engaging position at a point "behind" the stop so that the drum is free to rotate when the next length of tape is to be withdrawn.

In the dispensers illustrated herein the stops take the form of radially extending ridges in fixed spaced relation on the face of the disc, and adjustment of the machine to change the length of tape dispensed is provided for in one of the machines by having the said ridges of varying lengths, with the one pawl adapted to be moved, when desired, back and forth in a path across the face of the disc and to be positioned at desired points along the path, to regulate the distance of the drum's rotation according to the degree of arc that occurs between successive stops at the particular point where the pawl is then positioned to intercept them.

Means is provided for locking the pawl in stop-releasing position to permit uninterrupted rotation of the drum. The periphery of the measuring drum is designed and finished so that rotation of the drum is secured by temporary adhesive contact between the tape and the periphery as the tape is drawn from a supply roll thereof past the drum toward the severing means.

Two manually operated devices for dispensing pressure-sensitive adhesive tape in automatically measured definite lengths are described herein and illustrated in the annexed drawings as illustrative embodiments of this invention, one device (dispenser A, Figures 1 to 6) being adjustable to vary the length dispensed and both devices adjustable to dispense the tape in unlimited lengths when desired.

The end of each dispenser at which the severing means is located and at which the operator usually stands when facing the dispenser to operate it is called the front, and the terms right and left as used herein are from the point of view of such operator.

Figure 1 is a right side elevation of dispenser A.

Figure 2 is a plan view of the measuring and severing unit of A.

Figure 3 is a right side elevation of the said unit with part of the frame which supports the severing mechanism broken away.

Figure 4 is a front elevation of the said unit, omitting the pawl and drum.

Figure 5 is a front elevation of the pawl, disc and drum.

Figure 6 is a front elevation of the pawl mechanism.

Figure 7 is a left side elevation of dispenser B.

Figure 8 is a plan view of the measuring and severing unit of B.

Figure 9 is a right side elevation of the said unit with part of the frame which supports the severing mechanism broken away.

Figure 10 is a sectional view taken on the line 10—10 of Figure 8.

Figure 11 is a left side elevation of the pawl lock.

*Dispenser A*

Referring to Figure 1, a frame or casing 20 on base 21 is provided, having side walls which are spaced and equipped to hold within the rear portion of the casing a removable rotatable supply drum 26 on which is mounted a roll R of tape T, and to hold within its front portion a measuring and severing unit which includes the measuring drum 22. Both of the side walls of the casing 20 have guide members in the form of slots 20a which are cut in the walls to receive removably the spindles 26a of the supply drum 26, the lower end portions 20b of the slots being shaped to serve as bearings for the spindles.

The measuring and severing unit (Figures 2 to 6) comprises a base 23 to which all the mechanism for measuring and severing the tape is directly or indirectly attached.

The drum 22 is fixed on a shaft 24 which is journaled in the upright drum supports 25 and 25' which are secured to the base of the unit. The drum's periphery may be finished in any manner to enable it to hold the tape by an adhesive contact that is strong enough to cause the tape to rotate the drum when it is drawn past the drum but light enough to permit ready removal of the tape from the drum. In dispenser A (Figures 1 to 6, inclusive) the periphery is of smooth metal with a plurality of small perforations therein and the adhesive contact is supplied by the coating of pressure-sensitive adhesive on the under side of the tape T.

A sector-shaped recess or mortise 22a is cut into the right face of the drum with a stud 22b fixed in the angle of the recess to secure the leaf spring 27 which is loaded to press towards the forward wall of the mortise (counter-clockwise in Figure 3).

The disc 28 is journaled on the drum shaft 24 adjacent the right face of the drum. A pin 28a is fixed on the left face of the disc, projecting into the mortise 22a between the spring 27 and the forward wall of the mortise to effect mutual transfer of rotational impulse between the drum and disc. The drum rotates the disc forwardly by pressure of the spring 27 on the pin 28a. The disc exerts a rotational impulse on the drum rearwardly (to halt the drum but not to rotate it) by engagement of the pin with the rear wall of the mortise, such engagement being effected by pressure of the pin against the spring and thereby against the rear wall of the mortise.

Stops to halt rotation of the drum by engagement thereof with a catch member are provided in the form of four short radial ridges $x$ 90° apart, two medium length ridges $y$ 180° apart and two long ridges $z$ 180° apart, all on the outer or right face of the disc. A catch member for engaging the stops to halt rotation of the drum is provided in the form of a vertical pawl 30. The ridges $x$, $y$ and $z$ are spaced from each other, positioned on the disc and arranged in such sequence that when the pawl 30 is positioned near the rim of the disc as it is in Figure 3 the pawl will intercept a ridge at every 45° of turn of the disc, and when the pawl is positioned about midway between the rim of the disc and the center thereof the same pawl will intercept a ridge at every 90° of turn, and when positioned near the center of the disc, at every 180° of turn.

The pawl mechanism (Figure 6) comprises a longitudinally extending shaft 31 (Figures 2 and 3) to which is fixed the vertical pawl 30, the horizontal pawl lever 32 and the horizontal weight arm 33 which carries the weight W. The weight impels the pawl mechanism counterclockwise and thus keeps the pawl normally yieldingly impelled into stop-engaging position (Figure 5). Upward movement of the left end of the pawl lever impels the pawl mechanism clockwise and thus withdraws the pawl into stop-releasing position, shown in dotted lines in Figure 5.

The pawl shaft 31 is journaled in a rear bearing 25a and a forward bearing 23a. The shaft is free to slide axially rearwardly and forwardly in its bearings, thus moving the pawl towards or away from the center of the disc 28. A thumb piece 32a is removably fixed by the threaded engagement of its stem 32b in the right end of the lever 32 and is long enough to project outwardly through the aperture or "window" 20c in the side of the casing. Vertical bars and intervening slots 34 and 34' extend downwardly from the upper part of the window. When the pawl shaft 31 is slid forwardly in its bearings 25a and 23a until the stem 32b rests in the foremost slot as it is in Figure 1, the pawl 30 will occupy the position shown in Figure 3 and will intercept a stop or ridge ($x$, $y$ or $z$) at every 45° of turn of the disc. The slots are positioned so that when the stem 32b is moved by its thumb piece 32a downwardly, then rearwardly, then upwardly from the foremost slot to the middle slot 34, the pawl will have been moved rearwardly a sufficient distance towards the center of the disc to miss all the x stops but to intercept both the y and z stops so that it will halt the disc at every 90° of turn. Similarly, upon movement of the stem 32b still further to the rear until it rests in slot 34', the pawl will have been moved rearwardly and positioned so as to miss all the x and y stops and to intercept only the two z stops so that it will halt the disc at every 180° of turn.

The downwardly extending partition or bar 35 between slots 34 and 34' serves as a means for locking the pawl in stop-releasing position to permit uninterrupted rotation of the drum, by having its lower end concave (Figure 1) to receive and hold the stem 32a at a point sufficiently low to keep the pawl 30 clear of the stops x, y and z.

Means associated with the movable severing means whereby movement of the severing means withdraws the catch or pawl from the stop, is provided in the form of a longitudinal tripping lever 36 pivoted at 37, positioned so that upward movement of its rear end moves the left end of the pawl lever 32 upwardly enough to move the pawl to the right from stop-engaging to stop-releasing position. The tripping lever is contacted by an adjusting screw 32c on the pawl lever 32.

The tripping lever is actuated to move the pawl into stop-releasing position by the downward pressure on its forward end of the vertical rod 40 to whose upper end is fixed the severing edge 41. The rod is slidably mounted in the frame 42 with an adjusting nut 43 and a spring 44 below and above the shelf 42a, respectively, to secure such a relative distance of movement of the rod 40 as to move the pawl 30 the required distance when tape is drawn downwardly against the edge 41 in the severing operation, and to secure an upward thrust of the rod 40 sufficient to return the rod and attached severing edge 41 back up to normal starting position after pressure on the edge is removed.

The severing means here employed is movable, being fixed to the movable rod 40 as above described; it is also a "passive" severing edge, i. e., which severs the material drawn against it, comprising an edge 41 and a shelf 41a back of the edge to hold the uncut part of the tape by temporary adherence until the next piece is desired.

*Mode of operation*

Thumb piece 32a is pressed downwardly, moved towards the front or rear until it is beneath the partition 35 and then permitted to rise until its stem 32b rests in the concave end of the partition. This puts the pawl 30 in stop-releasing position (as shown in dotted lines in Figure 5) to permit free rotation of the drum. A roll R of tape T is mounted on the drum 26, positioned so that the tape faces adhesive side down when drawn through the machine. The tape is withdrawn from the roll, led over the periphery of the drum 22 and brought to rest by adhering its forward end to the shelf 41a of the severing means. The machine is next adjusted for dispensing the desired length by moving the thumb piece 32a downwardly from its stop-releasing position and then towards the front or rear until it is beneath the desired slot whereupon it is permitted to rise until its stem 32b rests in the desired slot. In Figure 1 it is in the foremost slot and this places or positions the pawl sufficiently close to the rim of the disc 28, as shown in Figure 3, to intercept all the stops x, y and z, as the disc rotates, thus measuring off the shortest lengths for which the illustrated disc is designed.

At least one length should be withdrawn and severed before the machine is ready to dispense the proper lengths in normal manner, since the pawl does not always fall into contact with the disc at the exact beginning of a measuring cycle when it is first dropped into stop-engaging position.

Following the severing of the first trial length, the operator grasps the tape at a point just back of where its forward end is held by temporary adherence to the shelf 41a, lifts the end off the shelf and draws the tape forwardly. Temporary adherence of the tape to the drum 22 rotates the latter counter-clockwise and its movement is imparted to the disc 28 by pressure of the spring 27 against the pin 28a. Rotation of the disc halts when one of the stops x, y or z is intercepted by the pawl 30, but rotation of the drum continues until the spring 27 has been forced against the rear wall of the mortise 22a by the now stationary pin 28a on the disc. Figure 3 illustrates the parts in this position. The drum being now stopped, the tape will move no further, whereupon the operator lowers the forward part of the tape against shelf 41a preparatory to severing the piece T—1 (Figure 1). The severing of the tape by downward pressure against the edge 41 depresses the edge-supporting rod 40 and with it the forward end of the tripping lever 36. The rear end of the latter raises and presses the left end of the pawl lever 32 upwardly which turns the pawl mechanism clockwise far enough to move the pawl into stop-releasing position, whereupon the pin 28a and with it the disc 28 (impelled by the spring 27) rotate forwardly until the spring forces the pin against the forward wall of the mortise, as shown in dotted lines in Figure 3. This rotates the disc far enough so that when downward pressure on the severing means is removed, thereby permitting the weight W to throw the pawl back into stop-engaging position, the pawl will not again intercept the same stop it has just released but will fall in "behind" the stop. During this slight forward rotation of the disc by the spring, the drum is held substantially motionless by the tape which adheres to it and which is stretched taut in either direction to the shalf 41a and to the roll R, thus serving as an anchor for the drum.

*Dispenser B*

Referring to Figure 7, a frame or casing 50 on base 51 is provided, having side walls which are spaced and equipped to receive within the rear portion of the casing a removable rotatable supply drum 56 on which is mounted a roll R' of tape T', and to receive within the front portion of the casing a measuring and severing unit which includes the measuring drum 52. Both of the side walls of the casing 50 have guide members in the form of slots 50a which are cut in the walls to receive removably the spindles 56a of the supply drum 56, the lower end portions 50b of the slots being shaped to serve as bearings for the spindles.

The measuring and severing unit (Figures 8 to 11) comprises a base 53 to which all the mechanism for measuring and severing the tape is directly or indirectly attached.

The drum 52 is fixed on a shaft 54 which is journaled in the upright supports 55 and 55' which are secured to the base of the unit. The periphery is of highly polished metal.

A sector-shaped recess or mortise 52a is cut into the right face of the drum with a stud 52b fixed in the angle of the mortise to secure the leaf spring 57 which is loaded to press towards the forward wall of the mortise (counter-clockwise in Figure 9).

The disc 58 is journaled on the drum shaft 54 adjacent the right face of the drum. A pin 58a is fixed on the left face of the disc, projecting into the mortise 52a between the spring 57 and the forward wall of the mortise to effect mutual transfer of rotational impulse between the drum and disc. The drum rotates the disc forwardly by pressure of the spring 57 on the pin 58a. The disc exerts a rotational impulse on the drum rearwardly (to halt the drum but not to rotate it) by engagement of the pin with the rear wall of the mortise, such engagement being effected by pressure of the pin against the spring and thereby against the rear wall of the mortise.

Stops to halt rotation of the drum by engagement thereof with a catch member are provided in the form of five radial ridges *r* 72° apart on the outer or right face of the disc. A catch member for engaging the stops to halt rotation of the drum is provided in the form of a vertical pawl 60.

The pawl mechanism comprises a longitudinally extending shaft 61 which is journaled in a rear bearing 53a and a front bearing 53b and to which is fixed the vertical pawl 60 and the horizontal pawl and weight lever 62 which carries the weight W'. The weight impels the pawl mechanism counter-clockwise and thus keeps the pawl normally yieldingly impelled into stop-engaging position (Figure 10). Upward movement of the pawl and weight lever impels the pawl mechanism clockwise and thus withdraws the pawl into stop-releasing position, shown in dotted lines in Figure 10.

Means for locking the pawl in stop-releasing position is provided in the form of a wedge 63, normally positioned in front of the weight W' (to the right of the weight in Figure 11) but adapted to be slid rearwardly beneath the weight so as to wedge or lift the weight, as shown in dotted lines in Figure 11, enough to move the pawl 60 out of the path of the stops. The slidable mounting of the wedge comprises a longitudinal slot 53c in the base and the screws 64 fixed in the wedge extending through the slot with their heads engaging the underside of the base. A wedge-moving pin 65 engages two upwardly extending lugs 63a on the wedge, is slidably mounted in the window 50c and has a thumb piece 65a removably fixed on its outer end, whereby the operator may lock the pawl in stop-releasing position or render it free for the normal metering operation by moving the thumb piece rearwardly or forwardly, respectively.

Means associated with the movable severing means whereby movement of the severing means withdraws the catch from the stop, is provided in the form of a longitudinal tripping lever 66 pivoted at 67, positioned so that upward movement of its rear end moves the pawl and weight lever 62 upwardly enough to move the pawl to the right (Figure 10) from stop-engaging to stop-releasing position. The tripping lever is contacted by an adjusting screw 62a that is on the pawl lever 62.

The tripping lever is actuated to move the pawl into stop-releasing position by the downward pressure on its forward end of the vertical rod 70 to whose upper edge is fixed the severing edge 71. The rod is slidably mounted in the frame 72 with an adjusting nut 73 and a spring 74 below and above the shelf 72a, respectively, to secure such a relative distance of movement of the rod 70 as to move the pawl 60 the required distance when tape is drawn downwardly against the edge 71 in the severing operation, and to secure an upward thrust of the rod 70 sufficient to return the rod and attached severing edge back up to normal starting position after pressure on the edge is removed.

The severing means here employed is movable, being fixed to the movable rod 70 as above described; it is also a "passive" severing edge, i. e., which severs by having the material drawn against it, comprising an edge 71 and a shelf 71a back of the edge to hold the uncut part of the tape by temporary adherence until the next piece is desired.

It is believed that the mode of operation of dispenser B will be clear from the previous description of the mode of operating dispenser A.

From the illustrated dispensers it will be seen that the invention provides a simple and inexpensive device, that may be operated by hand, which will provide automatically measured lengths of tape with no requirement of the operator other than to perform the single-handed act of withdrawing the tape and severing it by drawing it downwardly against a severing edge.

It will be obvious that dispensing units of a variety of types and designs may be constructed which will embody the present invention.

I claim:

1. A tape dispenser comprising means for holding a supply roll of tape, a movable severing means, a measuring drum between the tape-holding means and the severing means, a stop member associated with the drum, a catch member adapted to engage the stop automatically after a given amount of rotation of the drum whereby rotation of the drum may be halted at a given point, means associated with the movable severing means whereby movement of the severing means automatically disengages the catch and stop to render the drum free to rotate, and means adapted to advance the stop automatically upon disengagement of the catch and stop sufficiently to position the stop beyond the point of engagement.

2. A tape dispenser comprising means for holding a supply roll of tape, a movable severing means, a measuring drum between the tape-holding means and the severing means, a disc rotatably mounted adjacent the drum and coaxial therewith, means for mutual transfer of rotational impulse between the drum and the disc, a stop on the disc, a catch member adapted to engage the stop automatically after a given amount of rotation of the drum whereby rotation of the drum may be halted at a given point, means associated with the movable severing means whereby movement of the severing means automatically disengages the catch and stop to render the drum free to rotate, and means adapted to advance the disc automatically upon disengagement of the catch and stop sufficiently to position the stop beyond the point of engagement.

3. A tape dispenser comprising means for holding a supply roll of tape, a movable severing means, a measuring drum between the tape-holding means and the severing means, a disc rotatably mounted adjacent the drum and coaxial therewith, a pin on the disc and a complementary pin-engaging element on the drum for mutual transfer of rotational impulse between the drum and the disc, a stop on the disc, a pawl pivotally mounted adjacent the disc, means for holding the pawl in stop-engaging position to halt rotation of the disc by engagement of the stop and pawl, means actuated by movement of the severing means for moving the pawl into stop-releasing position, and means on the drum to impel the pin and disc to rotate forwardly in relation to the drum automatically upon movement of the pawl into stop-releasing position, sufficiently to position the stop beyond the point of its engagement with the pawl to permit forward rotation of the disc after the pawl has been returned to stop-engaging position.

4. The device of claim 3 with means for locking the pawl in stop-releasing position.

5. The device of claim 3 with a plurality of spaced stops on said disc.

6. The device of claim 3 with a plurality of stops in the form of spaced radial ridges of varying lengths on the face of said disc and means for positioning the pawl at desired points along a path parallel with the face of the disc to regulate the distance of the drum's rotation according to the degree of arc that occurs between successive stops at the point where the pawl is positioned to intercept them.

7. A pressure-sensitive adhesive tape dispenser comprising means for holding a supply roll of tape, a movable passive severing means against which the tape is drawn to effect severing thereof, a measuring drum between the tape-holding means and the severing means adapted to be rotated by the temporary adherence of the tape to its periphery as the tape is drawn past it, a disc adjacent the drum rotatably mounted coaxially therewith, a pin on the disc for mutual transfer of rotational impulse between the drum and the disc, complementary pin-engaging elements on the drum comprising two opposite walls of a mortise in the face of the drum which are spaced apart a distance greater than the diameter of the pin, a plurality of stops in the form of spaced radial ridges on the face of the disc, a pawl pivotally mounted adjacent the disc, means to hold the pawl yieldingly pressed into stop-engaging position to halt rotation of the disc by engagement of a stop and the pawl thereby to halt rotation of the drum by engagement of the pin and the rear wall of the mortise, means actuated by movement of the severing means for moving the pawl into stop-releasing position, and a leaf spring in the mortise between the pin and the rear wall loaded to impel the pin and disc to rotate forwardly in relation to the drum automatically upon movement of the pawl into stop-releasing position until the spring presses the pin against the forward wall of the mortise.

8. The device of claim 7 with means for locking the pawl in stop-releasing position.

9. The device of claim 7 in which the radial ridges on the disc are of varying lengths and which includes means for mounting the pivoted pawl to permit it to be reciprocally moved in a path parallel with the face of the disc and means for positioning the pawl at desired points along the path to regulate the distance of the drum's rotation according to the degree of arc that occurs between successive stops at the point where the pawl is positioned to intercept them.

FRED A. SMITH.